US008842210B2

(12) United States Patent
Hagiwara et al.

(10) Patent No.: US 8,842,210 B2
(45) Date of Patent: Sep. 23, 2014

(54) ZOOM LENS AND IMAGE CAPTURING APPARATUS

(71) Applicant: Sony Corporation, Tokyo (JP)

(72) Inventors: Hiroki Hagiwara, Tokyo (JP); Atsushi Oohata, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/855,918

(22) Filed: Apr. 3, 2013

(65) Prior Publication Data

US 2013/0314584 A1 Nov. 28, 2013

(30) Foreign Application Priority Data

May 24, 2012 (JP) ................................. 2012-118213

(51) Int. Cl.
*G02B 13/16* (2006.01)
*H04N 5/225* (2006.01)
*H04N 5/262* (2006.01)
*G02B 15/14* (2006.01)
*G02B 9/34* (2006.01)
*G02B 15/177* (2006.01)
*G02B 13/00* (2006.01)

(52) U.S. Cl.
CPC ............ *G02B 13/009* (2013.01); *G02B 15/177* (2013.01)
USPC ......... 348/335; 348/240.3; 359/686; 359/781

(58) Field of Classification Search
USPC .......... 348/240.99, 240.3, 335, 345; 359/684, 359/686, 771, 781
See application file for complete search history.

(56) References Cited

U.S. PATENT DOCUMENTS

| 5,793,531 A * | 8/1998 | Shibayama ................... 359/686 |
| 8,259,400 B2 * | 9/2012 | Shibata ......................... 359/781 |
| 8,531,780 B2 * | 9/2013 | Tsai et al. ..................... 359/715 |
| 2008/0106807 A1 * | 5/2008 | Minakata et al. ............. 359/781 |
| 2013/0314585 A1 * | 11/2013 | Oohata et al. ................. 348/345 |

FOREIGN PATENT DOCUMENTS

JP          2001-343584          12/2011

* cited by examiner

*Primary Examiner* — Daniel M Pasiewicz
(74) *Attorney, Agent, or Firm* — Rader, Fishman & Grauer PLLC

(57) ABSTRACT

There is provided a zoom lens including in order from an object side to an image side, a first lens group having negative refractive power, a second lens group having positive refractive power, a third lens group having negative refractive power, and a fourth lens group having positive refractive power. In zooming from a wide-angle end to a telescopic end, the first lens group moves to the object side in a manner that a distance toward the second lens group narrows, and a distance between the third lens group and the fourth lens group widens. The third lens group includes a single lens or a single cemented lens.

7 Claims, 13 Drawing Sheets

ZOOM LENS AND IMAGE CAPTURING APPARATUS

BACKGROUND

The present technology relates to a zoom lens used for an image capturing apparatus, and specifically, relates to a zoom lens which is used for image capturing apparatuses such as a digital video camera and a digital still camera and which is small in dimensions and is large in diameter and an image capturing apparatus using the zoom lens.

Digital video cameras, digital still cameras and the like using a solid-state image sensor such as a CCD (Charge Coupled Device) and CMOS (Complementary Metal-Oxide Semiconductor) are rapidly spreading recent years. Such spread of the digital cameras and the like leads to a growing request for a zoom lens which is small in dimensions and large in diameter and which is excellent in portability and operable for a large number of pixels. In view of such a request, cameras mounting a zoom lens that is small in dimensions and large in diameter are increasing especially. As such a zoom lens, there has been typically known a zoom lens including four lens groups of a negative lens, a positive lens, a negative lens and a positive lens and having zoom magnifications of approximately 3 to 8 (for example, see Japanese Patent Laid-Open No. 2001-343584).

SUMMARY

In the above-mentioned existing technology reduces the size of the lens in dimensions with four lens groups of a negative lens, a positive lens, a negative lens and a positive lens, and has a magnification factor of approximately 3. The existing technology, however, has a risk that a zoom lens that is far larger in diameter has to include, especially, huge second lens group and third lens group. Moreover, the existing technology is difficult to prevent a third lens group that is large in dimensions in case of securing an efficient amount of light down to the four corners of the screen since the spacing between the second lens group and third lens group is large in varying magnification. Moreover, in a manner in which vibration isolation is performed by moving the lens perpendicular to the optical axis, a zoom lens that is larger in diameter causes a larger vibration isolation group and larger driving components thereof, this leading to difficulty of attaining a smaller lens barrel as a whole.

It is desirable to provide a zoom lens which is compact in dimensions and large in diameter and which still attains excellent optical performance over the whole zooming range.

According to an embodiment of the present technology, there is provided a zoom lens including, in order from an object side to an image side, a first lens group having negative refractive power, a second lens group having positive refractive power, a third lens group having negative refractive power, and a fourth lens group having positive refractive power. In zooming from a wide-angle end to a telescopic end, the first lens group moves to the object side in a manner that a distance toward the second lens group narrows, and a distance between the third lens group and the fourth lens group widens. The third lens group includes a single lens or a single cemented lens.

The following conditional expressions (a) and (b) are satisfied, $$\Delta m3/(fw \times ft)^{1/2} < 0.3 \quad \text{conditional expression (a):}$$

$$d23\_max/(fw \times ft)^{1/2} < 0.5 \quad \text{conditional expression (b):}$$

where
$\Delta m3$ represents a variation amount of a distance between the second lens group and the third lens group in varying magnification, and d23_max represents a maximum value of the distance between the second lens group and the third lens group in varying magnification.

The lens includes four lens groups and satisfies the conditional expressions (a) and (b), reducing the whole optical length, and thus, attaining the zoom lens that is small in dimensions. Moreover, satisfying the conditional expressions (a) and (b) enables to attain the zoom lens that is small in dimensions, to keep an amount of light on the edges at an arbitrary zoom position large, and to realize high performance.

Moreover, in the first aspect, the second lens group may include, in order from the object side, four lenses of a first positive lens, a second positive lens, a negative lens and a third positive lens. The second positive lens and the negative lens are joined with each other. Such a configuration of the second lens group enables to reduce the whole optical lengths at the wide-angle end and at the telescopic end. Moreover, the first positive lens may be a positive single lens and the second positive lens and the negative lens may be joined with each other, this enabling to suppress the thickness of the second lens group in the optical axis direction with the positive power of the second lens group kept high.

Moreover, in the first aspect, the third lens group may satisfy the following conditional expression (c), $$-3 < f3g/ft < -0.8 \quad \text{conditional expression (c):}$$

where
f3g represents a focal length of the third lens group, and ft represents a system focal length at the telescopic end. When excess over the upper limit in the conditional expression (c) takes place, the power of the third lens group is too high, this resulting in difficulty of maintaining performance due to assembly errors in production. Moreover, when shortage to the lower limit in the conditional expression (c) takes place, the power of the third lens group is too low, this causing the whole optical length to lengthen and the zoom lens to be difficult to be small in dimensions.

Moreover, in the first aspect, vibration isolation may be performed by moving the third positive lens or the third lens group perpendicularly to an optical axis. The third positive lens or the third lens group, which is disposed behind the second lens group having the positive power (at the portion where the light rays are most concentrated), may be the vibration isolation group, this attaining the vibration isolation group and vibration isolation driving part to be small in dimensions and the whole lens barrel to be small in dimensions.

Moreover, in the first aspect, the zoom lens may include an aperture stop disposed on the second lens group or between the second lens group and the third lens group, and a light shielding member shielding a circumferential light ray on a part of the third lens group at the wide-angle end. The following conditional expression (d) may be satisfied, $$L \times Fno\_w/(fw \times ft)^{1/2} < 2.5 \quad \text{conditional expression (d):}$$

where
L represents a distance along an optical axis between the aperture stop and the light shielding member at the wide-angle end, Fno_w represents an F value at the wide-angle end, fw represents a system focal length at the wide-angle end, and ft represents a system focal length at the telescopic end. The aperture stop defining the F value may be disposed on the second lens group or the third lens group whose effective passing range of the light rays is narrower than those of the first lens group and fourth lens group, this attaining the aperture stop to be small in dimensions and be light. Furthermore, the circumferential light rays at the wide-angle end may be shielded on a part of the third lens group where the circumferential light rays are more separated from the F value light rays compared with the second lens group, this attaining the zoom lens that is large in diameter and the harmful light in the circumference of the screen to be cut effectively.

Moreover, in the first aspect, each of the third positive lens and the third lens group includes a single lens made of a resin. The third lens group relatively low in power may be a single lens made of a resin, this suppressing chromatic aberration from arising relatively and attaining the lens that is light. Furthermore, the third positive lens or the third lens group that is the single lens made of a resin may be the vibration isolation group, this attaining the vibration isolation group that is light and the vibration isolation driving components that is small in dimensions, and thus, attaining the whole lens barrel that is small in dimensions.

According to a second embodiment of the present technology, there is provided an image capturing apparatus including a zoom lens including, in order from an object side to an image side, a first lens group having negative refractive power, a second lens group having positive refractive power, a third lens group having negative refractive power, and a fourth lens group having positive refractive power, and an image sensor converting an optical image formed by the zoom lens into an electric signal. In zooming from a wide-angle end to a telescopic end, the first lens group moves to the object side in a manner that a distance toward the second lens group narrows, and a distance between the third lens group and the fourth lens group widens. The third lens group includes a single lens or a single cemented lens, and the above-described conditional expressions (a) and (b) are satisfied.

The present technology has the effects of being compact in dimension and large in diameter and still attaining excellent optical performance over the whole zooming range.

DETAILED DESCRIPTION OF THE EMBODIMENT(S)

Figure 1:
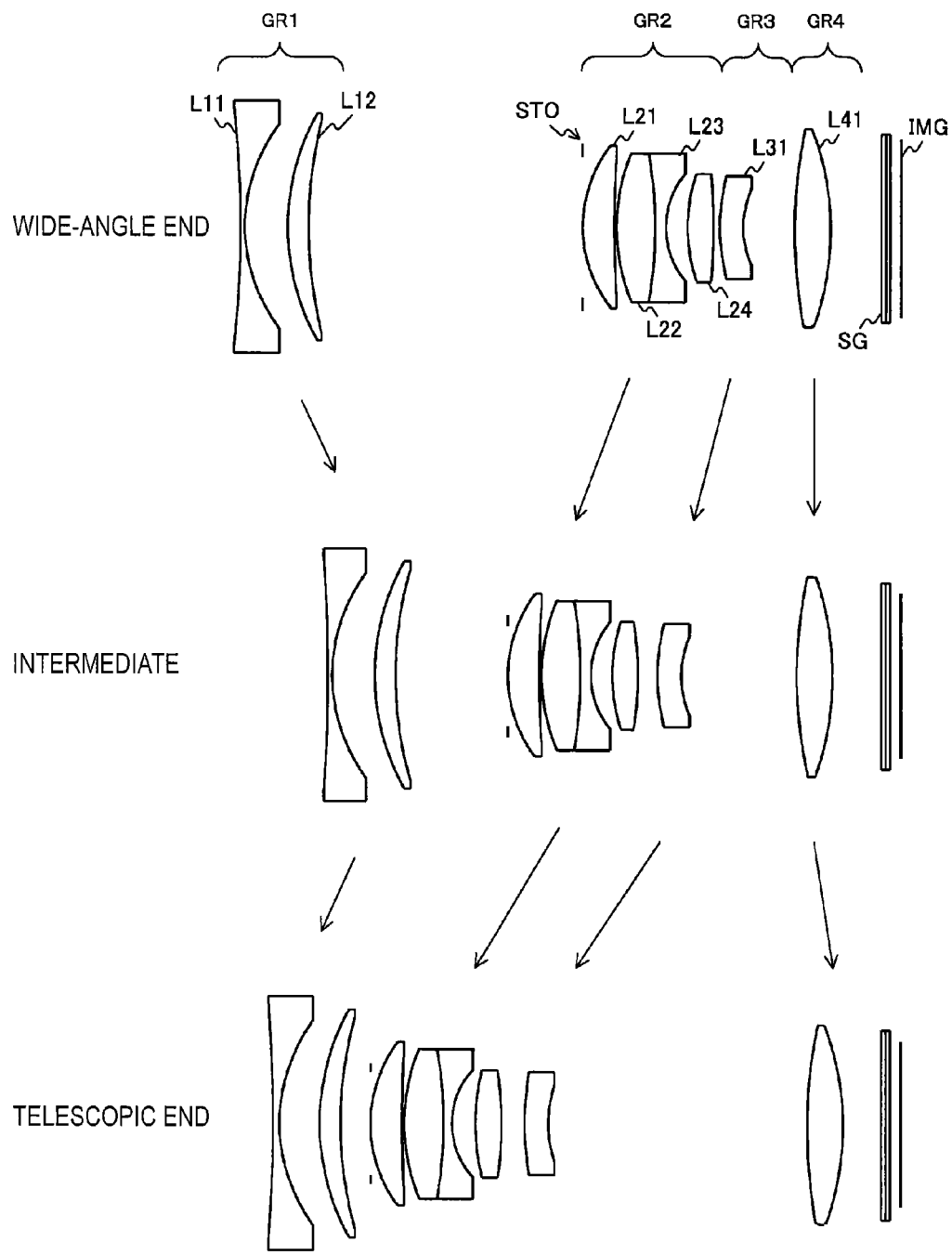
FIG. 1 is a diagram illustrating a lens configuration of a zoom lens according to a first embodiment of the present technology.

A zoom lens according to the present disclosure includes: in order from an object side to an image side, a first lens group having negative refractive power; a second lens group having positive refractive power; a third lens group having negative refractive power; and a fourth lens group having positive refractive power. In zooming from a wide-angle end to a telescopic end, the first lens group moves to the object side such that a distance toward the second lens group narrows, and a distance between the third lens group and the fourth lens group widens. The third lens group includes a single lens or a single cemented lens. Such a configuration enables to enhance a zooming effect of the second lens group and third lens group and to reduce the whole optical length, without enhancing the power of the second lens group too much.

Furthermore, the zoom lens according to the present disclosure satisfies the following conditional expressions (a) and (b):

$$\Delta m3/(fw \times ft)^{1/2} < 0.3 \qquad \text{conditional expression (a):}$$

$$d23\_max/(fw \times ft)^{1/2} < 0.5 \qquad \text{conditional expression (b):}$$

where $\Delta m3$ is a variation amount of a distance between the second lens group and the third lens group in varying magnification, and $d23\_max$ is a maximum value of the distance between the second lens group and the third lens group in varying magnification.

The conditional expression (a) is an expression for defining the ratio of the variation amount of the distance between the second lens group and third lens group in varying magnification relative to the square root of the product of the focal lengths at the wide-angle end and at the telescopic end. When excess over the upper limit in the conditional expression (a) takes place, the variation amount of the distance between the second lens group and third lens group is large relative to the focal lengths at the wide-angle end and at the telescopic end, and the relative movement amount of the third lens group relative to the second lens group is large, this causing the optical system to be difficult to be small in dimensions. Moreover, securing a sufficient amount of light on the edges at an arbitrary zoom position in varying magnification causes the zoom lens to be difficult to be small in dimensions. Accordingly, the zoom lens that satisfies the conditional expression (a) enables to suppress the variation amount of the distance between the second lens group and third lens group due to the zooming to suppress a decline of the amount of light on the edges and to be small in dimensions.

The conditional expression (b) is an expression for defining the ratio of the maximum value of the distance between the second lens group and third lens group in varying magnification relative to the square root of the product of the focal lengths at the wide-angle end and at the telescopic end. Namely, the conditional expression (b) is an expression for securing the amount of light on the edges and making the third lens group small in dimensions. When excess over the upper limit in the conditional expression (b) takes place, the distance between the third lens group and second lens group is large, this causing the third lens group to be difficult to be small in dimensions and small in diameter.

In addition, the zoom lens according to the present disclosure is preferable to satisfy the following conditional expressions (a') and (b'):

$$\Delta m3/(fw \times ft)^{1/2} < 0.2 \quad \text{conditional expression (a'):}$$

$$d23\_max/(fw \times ft)^{1/2} < 0.3 \quad \text{conditional expression (b'):}$$

Furthermore, in the zoom lens according to the present disclosure, the second lens group is desirable to include, in order from the object side, four lenses of a first positive lens, a second positive lens, a negative lens and a third positive lens, and the second positive lens and the negative lens is desirable to be joined with each other. Such a configuration of the second lens group enables to give the second lens group high positive power and to reduce the whole length of the optical system. Moreover, the first positive lens may be a positive single lens and the second positive lens and the negative lens may be joined with each other, this enabling to suppress the thickness of the second lens group in the optical axis direction with the positive power of the second lens group kept high. Moreover, the second positive lens and the negative lens may be a cemented lens obtained by joining them with each other, this enabling to reduce sensitivity to production errors and to improve ease of assembly.

Furthermore, the zoom lens according to the present disclosure is desirable to satisfy the following conditional expression (c):

$$-3 < f3g/ft < -0.8 \quad \text{conditional expression (c):}$$

where f3g is a focal length of the third lens group, and ft is a system focal length at the telescopic end.

The conditional expression (c) is an expression for defining the ratio of the focal length of the third lens group relative to the focal length of the whole lens system at the telescopic end. When excess over the upper limit in the conditional expression (c) takes place, the power of the third lens group is too high relative to the focal length at the telescopic end, this resulting in high sensitivity to assembly errors of the second lens group and third lens group and causing deterioration of performance in production. Meanwhile, when shortage to the lower limit in the conditional expression (c) takes place, the power of the third lens group is too low, this causing the distance between the second lens group and third lens group in varying magnification to be difficult to be suppressed. Moreover, suppressing the whole optical length causes the power of the second lens group to be too high, this increasing sensitivity to errors in assembly and causing deterioration of performance.

In addition, the zoom lens according to the present disclosure is still preferable to satisfy the following conditional expression (c'):

$$-2 < f3g/ft < -0.85 \quad \text{conditional expression (c'):}$$

Moreover, in the zoom lens according to the present disclosure, it is desirable that vibration isolation is performed by moving the third positive lens or the third lens group perpendicular to an optical axis. The third positive lens or the third lens group, which is disposed behind the second lens group having the positive power (at the portion where the light rays are most concentrated among the portions of the groups), may be the vibration isolation group, this enabling the vibration isolation group and vibration isolation driving part to be small in dimensions and the whole lens barrel to be small in dimensions and small in diameter. In particular, the third lens group may further satisfy the conditional expression (c), this enabling the stroke of the vibration isolation to be suitable and not too large and enabling it to be compatible with suppression of deterioration of performance in the vibration isolation.

Furthermore, in the zoom lens according to the present disclosure, it is desirable that an aperture stop defining the F value is disposed on the second lens group or the third lens group, that a circumferential light ray is shielded on a part of the third lens group at the wide-angle end, and that the following conditional expression (d) is satisfied:

$$L \times Fno\_w/(fw \times ft)^{1/2} < 2.5 \quad \text{conditional expression (d):}$$

where L is a distance along an optical axis between the aperture stop and the light shielding member at the wide-angle end, Fno_w is an F value at the wide-angle end, fw is a system focal length at the wide-angle end, and ft is a system focal length at the telescopic end.

The aperture stop defining the F value may be disposed on the second lens group or the third lens group whose effective passing range of the light rays is narrower than those of the first lens group and fourth lens group, this enabling the aperture stop to be small in dimensions and be light. Furthermore, it is more desirable to dispose the aperture stop defining the F value in front of the second lens group and to shield the circumferential light rays at the wide-angle end behind the third lens group. Separating the aperture stop regulating the F value light rays from the light shielding part of the circumferential light rays along the optical axis as far as possible enables the lens that is large in diameter to shield the light rays effectively at the position where the light rays along the axis are separated from the light rays off the axis (at the position away from the optical axis on the F value aperture stop), this enabling the zoom lens to be small in dimensions and high in performance compatibly.

When excess over the upper limit in the conditional expression (d) takes place, the aperture stop defining the F value is too far from the position of the light shielding part shielding the circumferential light rays at the wide-angle end relative to the diameter, this causing the zoom lens that is large in diameter to be difficult to be compatible with being small in dimensions.

In addition, the zoom lens according to the present disclosure is still preferable to satisfy the following conditional expression (d'):

$$L \times Fno\_w/(fw \times ft)^{1/2} < 2 \quad \text{conditional expression (d'):}$$

Furthermore, in the zoom lens according to the present disclosure, it is desirable that each of the third positive lens and the third lens group includes a single lens made of a resin. The third lens group relatively low in power may be a single lens made of a resin, this suppressing chromatic aberration from arising and enabling the lens to be light. Furthermore, the third positive lens and the third lens group each of which is the single lens made of a resin may be the vibration isolation group, this enabling the vibration isolation group to be light and the vibration isolation driving components to be small in dimensions, and thus, enabling the whole lens barrel to be small in dimensions.

In the zoom lens according to the present disclosure, in order to secure its excellent optical performance and enable it to be wide-angle, high zooming and small in dimensions, the lens groups are desirable to be configured as follows.

Regarding the first lens group, it is desirable that the negative lens and the positive meniscus lens are disposed closest to the object side and closest to the image side, respectively. The negative lens of the first lens group on its object side is desirable to employ, for example, glass material with a refractive index of 1.8 or more. The larger the refractive index is, the smaller the curvature of the first lens group can be, making the negative power of the first lens group high. Moreover, the positive meniscus lens on the object side that employs a meniscus lens convex to the object side makes an incident angle of light off the axis at the wide-angle end small, this enabling to suppress aberration off the axis from arising. Furthermore, the Abbe number of the positive meniscus lens is desirable to be 25 or less. The Abbe number being 25 or less enables the refractive index of the negative lens on the object side to be 1.85 or more and the light flux along the axis at the telescopic end to be suppressed effectively.

The second lens group is desirable to include, in order from the object side, a positive single lens, a cemented lens including a positive single lens and a negative single lens, and a positive single lens. Disposing the positive single lenses on the object side and image side of the second lens group enables to distribute the positive power of the second lens group thereon and to make the positive power high, this enabling to reduce the whole length of the optical system. Moreover, disposing the cemented lens between the positive single lenses on the object side and image side enables to suppress chromatic aberration and to suppress eccentric sensitivity in the second lens group, this reducing sensitivity to production errors and improving ease of assembly. Furthermore, making the positive single lens on the object side non-spherical and disposing an F value aperture stop in its vicinity enable to make the power of the second lens group high, and in addition, to correct aberration (especially, spherical aberration), being still preferable.

The third lens group is desirable to include a negative cemented lens or a negative single lens, and further, to have a convex surface on the object side and at least one non-spherical surface. The convex surface on the object side makes an incident angle of F value light incident from the second lens group small, this enabling to correct aberration on the axis effectively even for a lens that is large in dimension. Moreover, it is desirable to dispose the non-spherical surface at least on the image side of the third lens group. Disposing the non-spherical surface on the image side of the third lens group far from the aperture stop defining the F value enables to correct aberration off the axis effectively. Moreover, when the third lens group is the vibration isolation group, disposing the non-spherical surface enables to suppress variations of various kinds of aberration in vibration isolation effectively. Furthermore, the negative single lens is desirable to have the Abbe number of 50 or more in consideration of the chromatic aberration.

The fourth lens group is desirable to include a single lens and to be used, for example, for focusing. The fourth lens group that is configured of a single lens attains minimal load on the driving part in transportation and realizes the lens barrel which is small in dimensions and is light.

In the zoom lens according to the embodiment of the present disclosure, shifting one lens group out of the first lens group to fourth lens group or part of lenses in one lens group in the direction substantially perpendicular to the optical axis enables to shift the position of the image. Specifically, the second lens group or the third lens group, which is low in height of the effective light rays, which group is configured as the vibration isolation group enables the vibration isolation group to be small in dimensions and be light and its driving system to be small in dimensions and be light, this leading to the lens barrel that is small in dimensions. Moreover, the zoom lens in which the position of the image can be shifted is desirable to be integrated with a detection system detecting image blur, a driving system shifting the individual lens groups, and a control system giving the shift amount to the driving system based on the output from the detection system, allowed to function as a vibration isolation optical system correcting camera shake and image blur. Furthermore, in order to prevent moire fringe patterns from arising on the image side of the lens system, a low-pass filter may be disposed and an infrared light absorption filter may be disposed according to spectroscopic sensitivity characteristics of light receiving elements.

In the zoom lens according to the embodiment of the present disclosure, a negative lens high in power is disposed on the surface of incidence, tending to cause distortion aberration presenting barrel-shaped distortion at the wide-angle end. Against this, it is desirable to employ a function of changing image distortion by processing captured image data, and thus, to correct the image distortion caused by the distortion aberration arising in the optical system for the observation. Moreover, deliberately allowing the barrel-shaped distortion to arise gives a low height of incident light at the wide-angle end compared with the field of view, this enabling the diameter of the first lens group to be small and the reflective members in the first lens group to be small in dimensions, attaining further smaller ones.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted. The description is made in the following order.

1. First Embodiment (Example 1 of Numerical Values)
2. Second Embodiment (Example 2 of Numerical Values)
3. Third Embodiment (Example 3 of Numerical Values)
4. Application Example (Image Capturing Apparatus)

Incidentally, signs and the like used in the following tables and descriptions mean as follows. A "surface number" designates the ith surface from the object side. A "curvature radius R" designates the curvature radius of the ith surface from the object side. A "spacing Di" denotes the variable spacing with respect to the spacing between the ith surface and the (i+1)th surface along the axis. Regarding the "surface number", "ASP" indicates that the surface is non-spherical. Regarding the "curvature radius R", "INFINITY" indicates that the surface is planar. A "refractive index Nd" designates the refractive index of the glass material having the ith surface on its object side which index is to the d lines (wavelength of 587.6 nm). An "Abbe number Vd" designates the Abbe number of the glass material having the ith surface on its object side which number is to the d lines. The sign "f" denotes a focal length. The sign "Fno" denotes an F value (F number). The sign "ω" denotes a half FOV.

Moreover, some zoom lenses used in the individual embodiments have non-spherical lens surfaces. Each of them is supposed to be defined as follows:

$$x=cy^2/(1+(1-(1+\kappa)c^2y^2)^{1/2})+A4y^4+A6y^6+A8y^8+A10y^{10}$$

where the sign "x" denotes a distance from the vertex of the lens surface in the optical axis direction (amount of sagging), the sign "y" denotes a height in the direction perpendicular to the optical axis, the sign "c" denotes a paraxial curvature at the lens vertex, and the sign "κ" denotes a conic constant. In addition, the numbers A4, A6, A8 and A10 denote fourth-order, sixth-order, eighth-order and tenth-order non-spherical coefficients.

1. First Embodiment

Lens Configuration

FIG. 1 is a diagram illustrating a lens configuration of a zoom lens according to a first embodiment of the present technology. The zoom lens includes, in order from the object side to the image side, a first lens group GR1 having negative refractive power, a second lens group GR2 having positive refractive power, a third lens group GR3 having negative refractive power and a fourth lens group GR4 having positive refractive power. In each of this figure and other figures illustrating the following lens configurations, the upper portion, middle portion and lower portion illustrate the lens positions at the wide-angle end, at the intermediate focal length and at the telescopic end, respectively. As the focal length comes closer to that of the telescopic end from that of the wide-angle end, the lenses locate at the positions indicated by the arrows. The solid line arrows indicate the movements thereof in zooming.

The first lens group GR1 includes, in order from the object side to the image side, a double convex-shaped negative lens L11 and a meniscus-shaped positive lens L12 convex to the object side.

The second lens group GR2 includes, in order from the object side to the image side, a positive single lens L21 convex to the object side and a cemented lens configured by joining a double convex-shaped positive lens L22, a double concave-shaped negative lens L23, and a double convex-shaped positive lens L24.

The third lens group GR3 includes a meniscus-shaped negative lens L31 convex to the object side.

The fourth lens group GR4 includes a double-convex positive lens L41.

In the zoom lens according to the first embodiment, an aperture stop STO is disposed on the object side of the second lens group GR2. The aperture stop STO defines the F value. Moreover, a filter SG is disposed between the fourth lens group GR4 and an image plane IMG. Furthermore, with a mask pasted on the imaging surface (R2 surface) of the negative lens L31 of the third lens group GR3, light rays on the circumference at the wide-angle end are shielded.

The zoom lens according to the first embodiment has a magnification factor of 3.2. In zooming, the first lens group GR1, second lens group GR2, third lens group GR3 and fourth lens group GR4 are movable.

[Specifications of Zoom Lens]

Table 1 presents data of the lenses in Example 1, in which specific numerical values are applied to the zoom lens according to the first embodiment.

TABLE 1

| Surface Number i | Curvature Radius R | Spacing D | Refractive Index Nd | Abbe Number Vd |
|---|---|---|---|---|
| 1(ASP) | −149.9996 | 0.500 | 1.851348 | 40.1045 |
| 2(ASP) | 15.1043 | 4.030 | | |
| 3 | 21.6089 | 2.070 | 2.0027 | 19.317 |
| 4 | 38.0000 | 26.321 | | |
| 5 | INFINITY | 0.000 | Opening Aperture Stop | |
| 6(ASP) | 11.8965 | 3.150 | 1.77376 | 47.167 |
| 7(ASP) | 116.1629 | 0.150 | | |
| 8 | 18.2361 | 3.770 | 1.83481 | 42.7207 |
| 9 | −33.8241 | 0.860 | 1.74901 | 26.3211 |
| 10 | 7.2814 | 2.100 | | |
| 11 | 16.8286 | 2.500 | 1.53600 | 56.0000 |
| 12 | −44.4056 | 0.700 | | |
| 13(ASP) | 16.5926 | 2.250 | 1.592014 | 67.0227 |
| 14(ASP) | 8.598 | 4.820 | | |
| 15(ASP) | 45.7058 | 3.500 | 1.592014 | 67.0227 |
| 16(ASP) | −25.0627 | 4.844 | | |
| 17 | INFINITY | 0.300 | 1.516798 | 64.1983 |
| 18 | INFINITY | 0.150 | | |
| 19 | INFINITY | 0.500 | 1.556708 | 58.5624 |
| 20 | INFINITY | 1.000 | | |
| 21 | INFINITY | 0.000 | | |

In the zoom lens according to the first embodiment, the both surfaces of the negative lens L11 of the first lens group GR1 (first surface and second surface), the both surfaces of the positive lens L21 of the second lens group GR2 (sixth surface and seventh surface), the both surfaces of the positive lens L31 of the third lens group GR3 (thirteenth surface and fourteenth surface) and the both surfaces of the positive lens L41 of the fourth lens group GR4 (fifteenth surface and sixteenth surface) are non-spherical. Table 2 presents the conic constants κ and the fourth-order, sixth-order, eighth-order and tenth-order non-spherical coefficients A4, A6, A8 and A10 of these surfaces. In addition, in Table 2 and the following other tables presenting non-spherical coefficients, the expression "E−i" is an exponential expression with a base of 10, that is, represents "$10^{-i}$". For example, the expression "0.12345E−05" represents "$0.12345 \times 10^{-5}$".

TABLE 2

| Surface Number | κ | A4 | A6 | A8 | A10 |
|---|---|---|---|---|---|
| 1 | 0 | −2.80742E−05 | 3.30306E−07 | −1.41743E−09 | 1.90007E−12 |
| 2 | 0 | −4.09871E−05 | 1.31996E−07 | 1.20014E−09 | −1.21616E−11 |
| 6 | 0 | −5.28855E−05 | 2.38601E−07 | −1.01380E−08 | 1.98663E−10 |
| 7 | 0 | 5.04527E−06 | 5.76862E−07 | −6.79844E−09 | 1.80657E−10 |
| 13 | 0 | 4.30359E−04 | 4.44756E−06 | 1.93761E−08 | −3.60089E−10 |
| 14 | 0 | 6.52905E−04 | 6.14224E−06 | −1.16155E−07 | 6.36895E−10 |
| 15 | 0 | 1.49343E−05 | −6.91862E−08 | −1.54399E−09 | 7.67520E−12 |
| 16 | 0 | 5.89754E−05 | −9.72308E−07 | 7.86103E−09 | −2.95396E−11 |

Table 3 presents the focal lengths f, F values Fno and half FOVs ω at the wide-angle end, at the intermediate focal length and at the telescopic end in Example 1.

TABLE 3

|  | Wide-Angle End | Intermediate Focal Length | Telescopic End |
|---|---|---|---|
| f | 11.004 | 19.634 | 35.424 |
| Fno | 1.855 | 3.399 | 5.065 |
| ω | 32.986 | 21.613 | 12.526 |

In the zoom lens according to the first embodiment, a spacing D4 between the first lens group GR1 and second lens group GR2, a spacing D12 between the second lens group GR2 and third lens group GR3, a spacing D14 between the third lens group GR3 and fourth lens group GR4 and a spacing D16 between the fourth lens group GR4 and filter SG vary in zooming between the wide-angle end and telescopic end. Table 4 presents the variable spacings with respect to the respective spacings at the wide-angle end, at the intermediate focal length and at the telescopic end in Example 1.

TABLE 4

|  | Wide-Angle End | Intermediate Focal Length | Telescopic End |
|---|---|---|---|
| f | 11.004 | 19.634 | 35.424 |
| D4 | 26.321 | 10.613 | 2.750 |
| D12 | 0.700 | 1.929 | 2.200 |
| D14 | 4.820 | 11.019 | 24.878 |
| D16 | 4.844 | 4.609 | 3.632 |

[Aberration of Zoom Lens]

Figure 2:
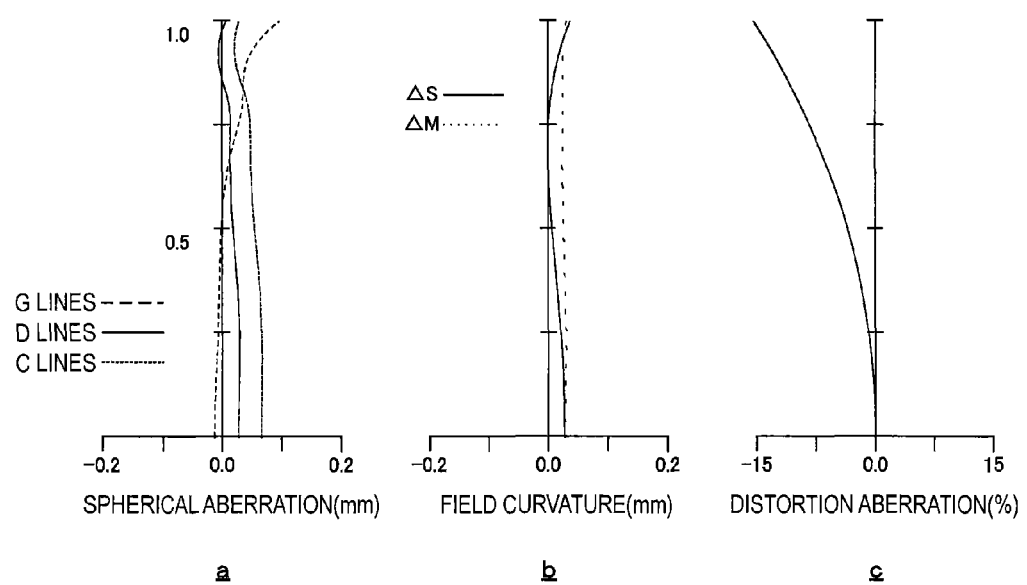
FIG. 2 illustrates aberration of the zoom lens according to the first embodiment of the present technology at the wide-angle end at infinity focus.
Figure 3:
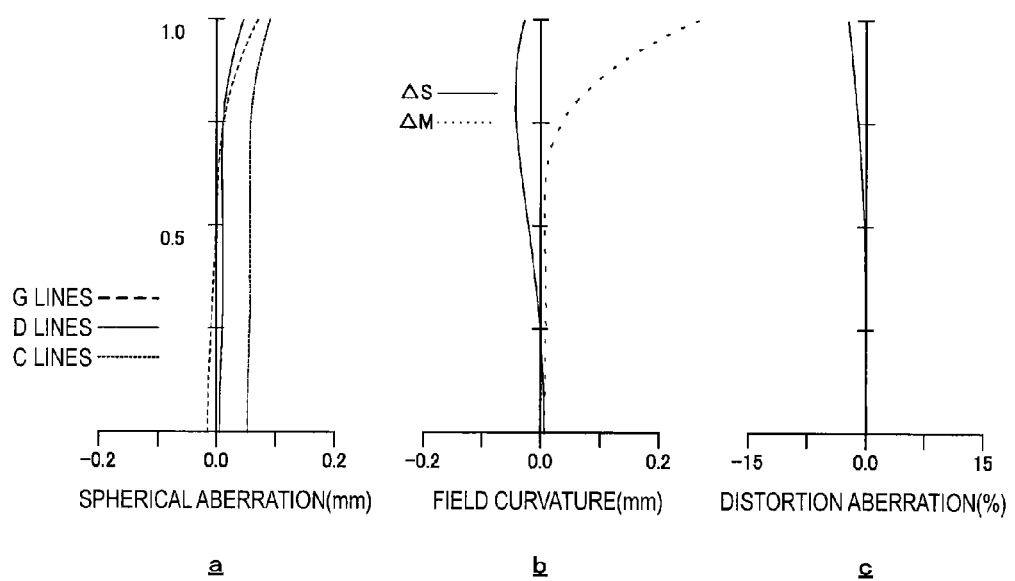
FIG. 3 illustrates aberration of the zoom lens according to the first embodiment of the present technology at the intermediate focal length at infinity focus.
Figure 4:
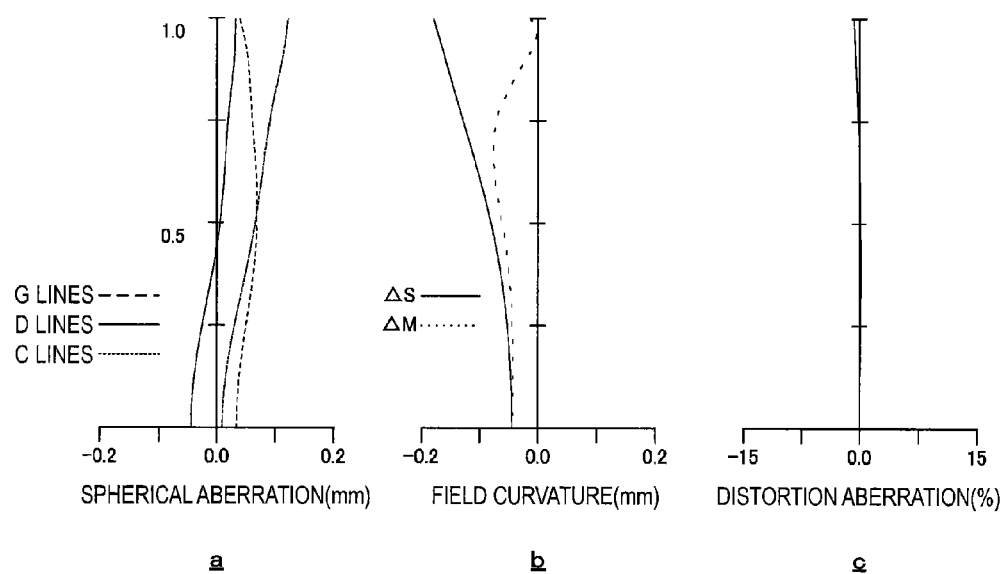
FIG. 4 illustrates aberration of the zoom lens according to the first embodiment of the present technology at the telescopic end at infinity focus.

FIGS. 2 to 4 illustrate aberration diagrams of the zoom lens according to the first embodiment of the present technology at infinity focus. FIG. 2, FIG. 3 and FIG. 4 illustrate aberration diagrams at the wide-angle end, at the intermediate focal length and at the telescopic end, respectively. Portions a, portions b and portions c in these figures illustrate spherical aberration diagrams, field curvature diagrams and distortion aberration diagrams, respectively.

In addition, in the spherical aberration diagrams, the solid lines, broken lines and dotted lines indicate values for the d lines (587.6 nm), g lines (wavelength of 435.8 nm) and c lines (wavelength of 656.3 nm). Moreover, in the astigmatism diagrams, the solid lines and dotted lines indicate values for the sagittal image surfaces and meridional image surfaces.

It is apparent from the aberration diagrams that Example 1 attains excellent imaging performance, correcting the aberrations favorably.

2. Second Embodiment

Lens Configuration

Figure 5:
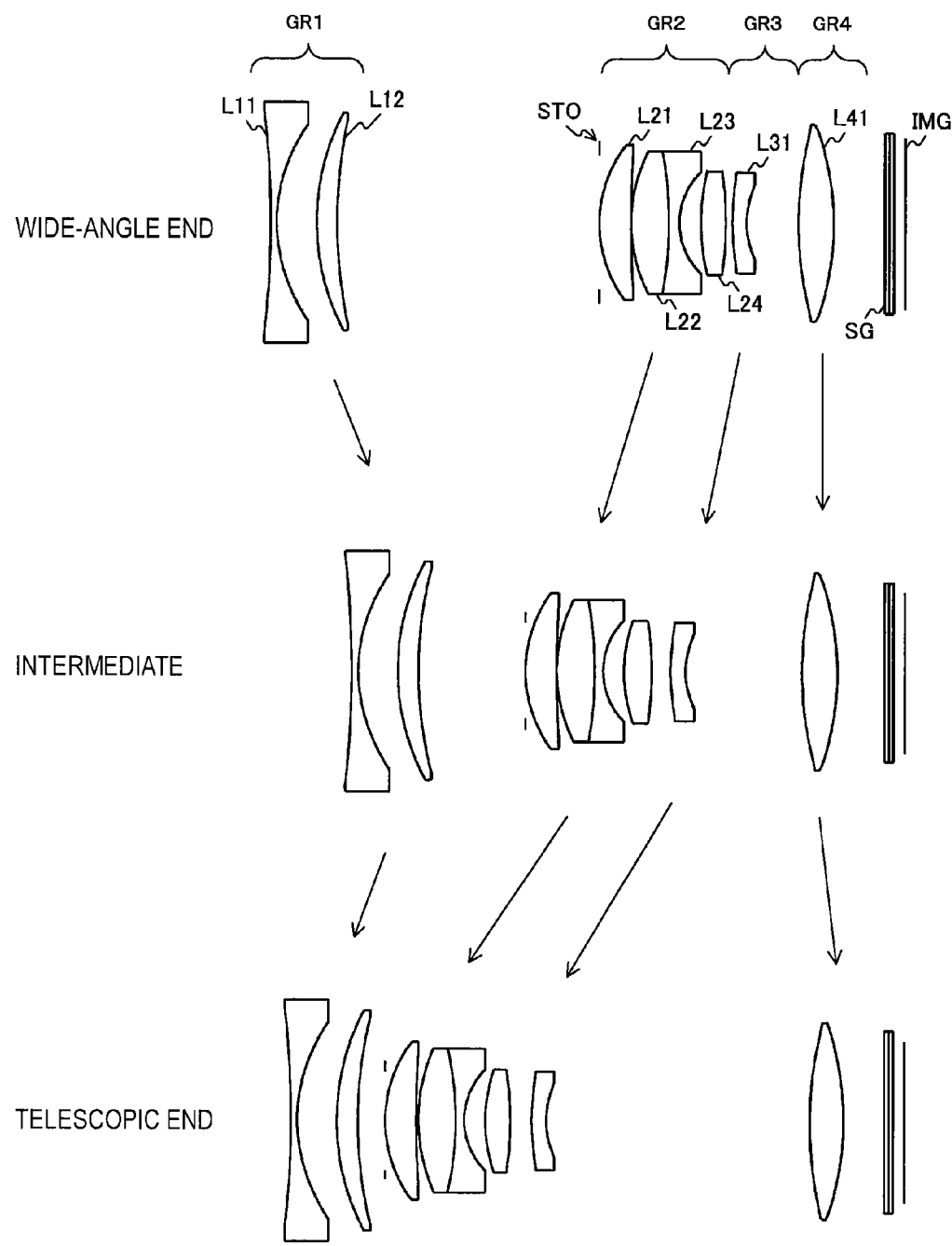
FIG. 5 is a diagram illustrating a lens configuration of a zoom lens according to a second embodiment of the present technology.

FIG. 5 is a diagram illustrating a lens configuration of a zoom lens according to a second embodiment of the present technology. The zoom lens includes, in order from the object side to the image side, a first lens group GR1 having negative refractive power, a second lens group GR2 having positive refractive power, a third lens group GR3 having negative refractive power and a fourth lens group GR4 having positive refractive power.

The first lens group GR1 includes, in order from the object side to the image side a double concave-shaped negative lens L11 concave to the object side and a meniscus-shaped positive lens L12 convex to the object side.

The second lens group GR2 includes, in order from the object side to the image side, a positive single lens L21 convex to the object side, and a cemented lens configured by joining a double convex-shaped positive lens L22, a double concave-shaped negative lens L23, and a double convex-shaped positive lens L24.

The third lens group GR3 includes a meniscus-shaped negative lens L31 convex to the object side.

The fourth lens group GR4 includes a double-convex positive lens L41.

In the zoom lens according to the second embodiment, an aperture stop STO is disposed on the object side of the second lens group GR2. The aperture stop STO defines the F value. Moreover, a filter SG is disposed between the fourth lens group GR4 and an image plane IMG. Furthermore, with a mask pasted on the imaging surface (R2 surface) of the negative lens L31 of the third lens group GR3, light rays on the circumference at the wide-angle end are shielded.

The zoom lens according to the second embodiment has a magnification factor of 3.2. In zooming, the first lens group GR1, second lens group GR2, third lens group GR3 and fourth lens group GR4 are movable.

[Specifications of Zoom Lens]

Table 5 presents data of the lenses in Example 2, in which specific numerical values are applied to the zoom lens according to the second embodiment.

TABLE 5

| Surface Number i | Curvature Radius R | Spacing D | Refractive Index Nd | Abbe Number Vd |
|---|---|---|---|---|
| 1(ASP) | −104.6241 | 0.500 | 1.851348 | 40.1045 |
| 2(ASP) | 15.6174 | 4.030 |  |  |
| 3 | 23.4091 | 2.070 | 2.0027 | 19.317 |
| 4 | 45.0000 | 26.096 |  |  |
| 5 | INFINITY | 0.000 | Opening Aperture Stop |  |
| 6(ASP) | 12.1036 | 3.150 | 1.77376 | 47.167 |
| 7(ASP) | 114.2156 | 0.100 |  |  |
| 8 | 16.6038 | 3.750 | 1.83481 | 42.7207 |
| 9 | −35.7469 | 0.860 | 1.74901 | 26.3211 |
| 10 | 7.1463 | 2.100 |  |  |
| 11 | 16.6769 | 2.500 | 1.53600 | 56.0000 |
| 12 | −45.5368 | 0.700 |  |  |
| 13(ASP) | 16.5975 | 1.556 | 1.53600 | 56.0000 |
| 14(ASP) | 7.9469 | 5.210 |  |  |
| 15(ASP) | 38.6079 | 3.500 | 1.592014 | 67.0227 |
| 16(ASP) | −25.4583 | 5.080 |  |  |
| 17 | INFINITY | 0.300 | 1.516798 | 64.1983 |
| 18 | INFINITY | 0.150 |  |  |
| 19 | INFINITY | 0.500 | 1.556708 | 58.5624 |
| 20 | INFINITY | 1.000 |  |  |
| 21 | INFINITY | 0.000 |  |  |

In the zoom lens according to the second embodiment, the both surfaces of the negative lens L11 of the first lens group GR1 (first surface and second surface), the both surfaces of the positive lens L21 of the second lens group GR2 (sixth surface and seventh surface), the both surfaces of the positive lens L31 of the third lens group GR3 (thirteenth surface and fourteenth surface) and the both surfaces of the positive lens L41 of the fourth lens group GR4 (fifteenth surface and sixteenth surface) are non-spherical. Table 6 presents the conic constants κ and the fourth-order, sixth-order, eighth-order and tenth-order non-spherical coefficients A4, A6, A8 and A10 of these surfaces.

TABLE 6

| Surface Number | κ | A4 | A6 | A8 | A10 |
|---|---|---|---|---|---|
| 1 | 0 | −2.80304E−05 | 3.48626E−07 | −1.63655E−09 | 2.42306E−12 |
| 2 | 0 | −4.34087E−05 | 1.42160E−07 | 1.04665E−09 | −1.24920E−11 |
| 6 | 0 | −5.02623E−05 | 2.00811E−07 | −9.38082E−09 | 1.97427E−10 |
| 7 | 0 | 5.26195E−06 | 4.88591E−07 | −5.23925E−09 | 1.75707E−10 |
| 13 | 0 | −8.57280E−04 | 1.69717E−05 | −1.82000E−07 | 1.26042E−09 |
| 14 | 0 | −1.16374E−03 | 2.13885E−05 | −4.59796E−07 | 3.86935E−09 |
| 15 | 0 | 2.48695E−06 | 5.38880E−07 | −6.18114E−09 | 7.20872E−16 |
| 16 | 0 | 4.11603E−05 | 8.30781E−08 | −3.54062E−09 | −5.10862E−12 |

Table 7 presents the focal lengths f, F values Fno and half FOVs ω at the wide-angle end, at the intermediate focal length and at the telescopic end in Example 2.

TABLE 7

|  | Wide-Angle End | Intermediate Focal Length | Telescopic End |
|---|---|---|---|
| f | 11.003 | 19.632 | 35.438 |
| Fno | 1.855 | 3.414 | 5.095 |
| ω | 32.986 | 21.613 | 12.526 |

In the zoom lens according to the second embodiment, a spacing D4 between the first lens group GR1 and second lens group GR2, a spacing D12 between the second lens group GR2 and third lens group GR3, a spacing D14 between the third lens group GR3 and fourth lens group GR4 and a spacing D16 between the fourth lens group GR4 and filter SG vary in zooming between the wide-angle end and telescopic end. Table 8 presents the variable spacings with respect to the respective spacings at the wide-angle end, at the intermediate focal length and at the telescopic end in Example 2.

TABLE 8

|  | Wide-Angle End | Intermediate Focal Length | Telescopic End |
|---|---|---|---|
| f | 11.003 | 19.632 | 35.438 |
| D4 | 26.096 | 10.604 | 2.750 |
| D12 | 0.700 | 1.9537 | 2.133 |
| D14 | 5.210 | 11.744 | 26.173 |
| D16 | 5.080 | 4.632 | 3.931 |

[Aberration of Zoom Lens]

Figure 6:
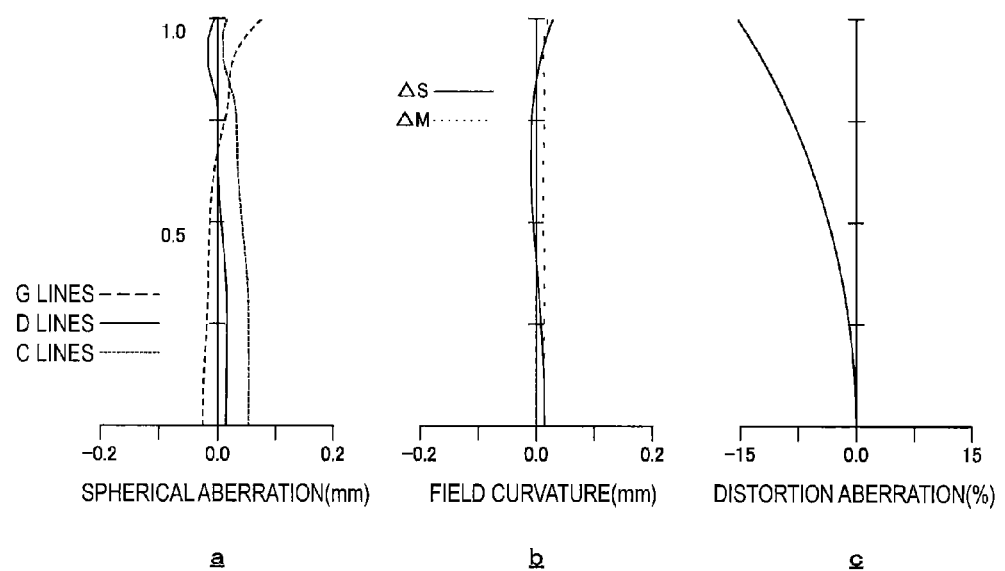
FIG. 6 illustrates aberration of the zoom lens according to the second embodiment of the present technology at the wide-angle end at infinity focus.
Figure 7:
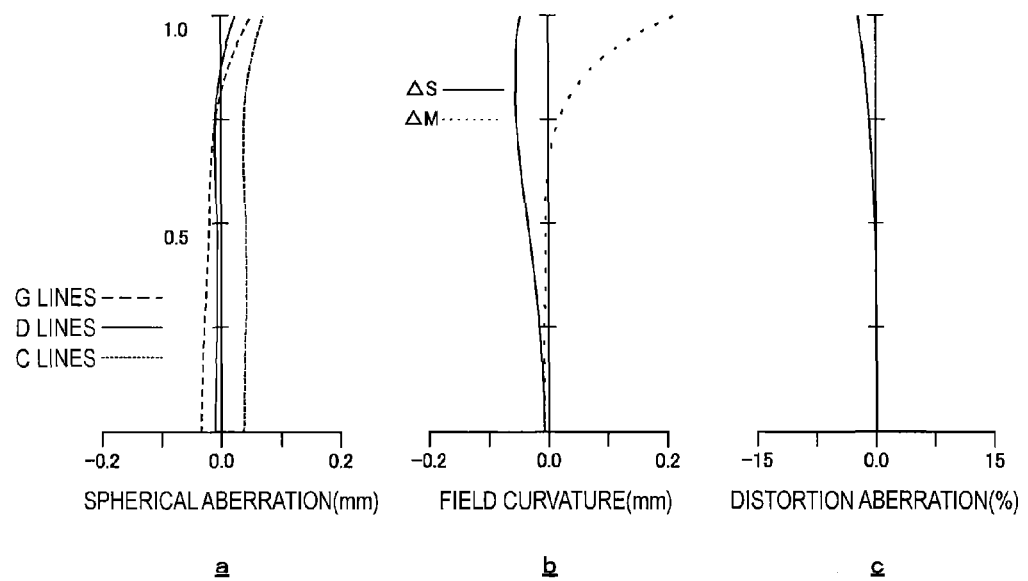
FIG. 7 illustrates aberration of the zoom lens according to the second embodiment of the present technology at the intermediate focal length at infinity focus.
Figure 8:
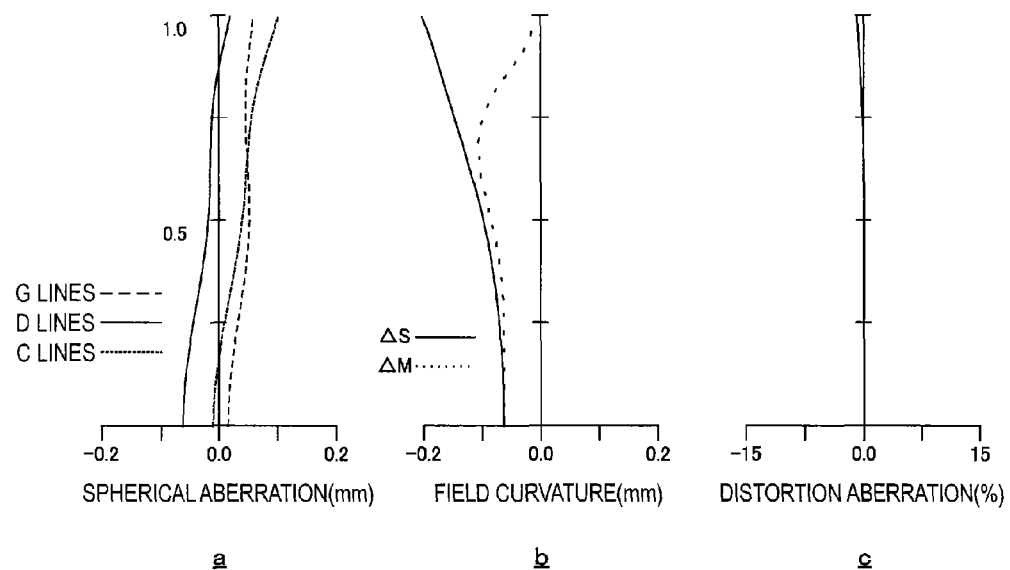
FIG. 8 illustrates aberration of the zoom lens according to the second embodiment of the present technology at the telescopic end at infinity focus.

FIGS. 6 to 8 illustrate aberration diagrams of the zoom lens according to the second embodiment of the present technology at infinity focus. FIG. 6, FIG. 7 and FIG. 8 illustrate aberration diagrams at the wide-angle end, at the intermediate focal length and at the telescopic end, respectively. Portions a, portions b and portions c in these figures illustrate spherical aberration diagrams, field curvature diagrams and distortion aberration diagrams, respectively.

In addition, in the spherical aberration diagrams, the solid lines, broken lines and dotted lines indicate values for the d lines (587.6 nm), g lines (wavelength of 435.8 nm) and c lines (wavelength of 656.3 nm). Moreover, in the astigmatism diagrams, the solid lines and dotted lines indicate values for the sagittal image surfaces and meridional image surfaces.

It is apparent from the aberration diagrams that Example 2 attains excellent imaging performance, correcting the aberrations favorably.

3. Third Embodiment

Lens Configuration

Figure 9:
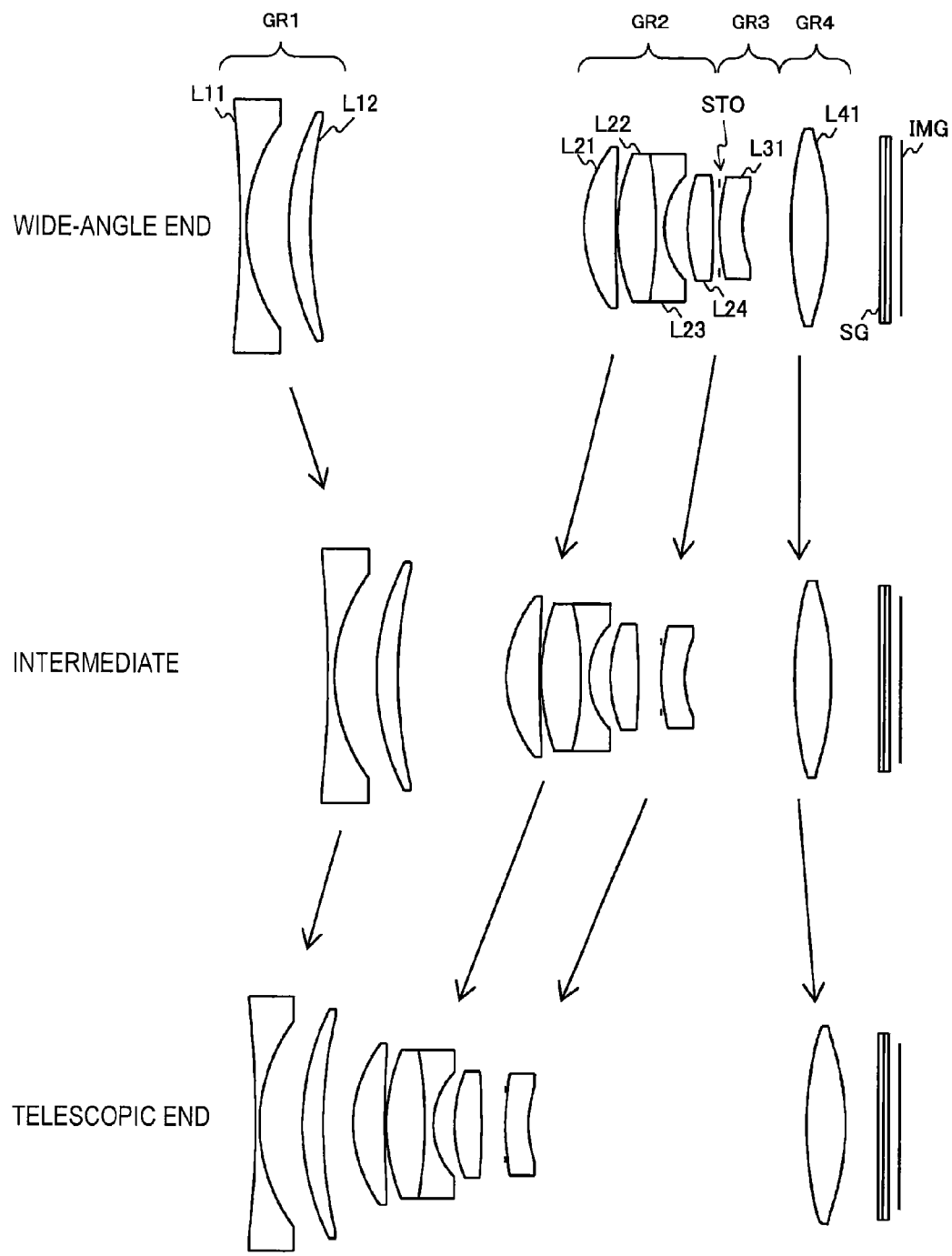
FIG. 9 is a diagram illustrating a lens configuration of a zoom lens according to a third embodiment of the present technology.

FIG. 9 is a diagram illustrating a lens configuration of a zoom lens according to a third embodiment of the present technology. The zoom lens includes, in order from the object side to the image side, a first lens group GR1 having negative refractive power, a second lens group GR2 having positive refractive power, a third lens group GR3 having negative refractive power and a fourth lens group GR4 having positive refractive power.

The first lens group GR1 includes a double concave-shaped negative lens L11 and a meniscus-shaped positive lens L12 convex to the object side.

The second lens group GR2 includes, in order from the object side to the image side, a positive single lens L21 convex to the object side and a cemented lens configured by joining a double convex-shaped positive lens L22, a double concave-shaped negative lens L23, and a double convex-shaped positive lens L24.

The third lens group GR3 includes a meniscus-shaped negative lens L31 convex to the object side.

The fourth lens group GR4 includes a double-convex positive lens L41.

In the zoom lens according to the third embodiment, an aperture stop STO is disposed between the second lens group GR2 and third lens group GR3. The aperture stop STO defines the F value. Moreover, a filter SG is disposed between the fourth lens group GR4 and an image plane IMG. Furthermore, with a mask pasted on the imaging surface (R2 surface) of the negative lens L31 of the third lens group GR3, light rays on the circumference at the wide-angle end are shielded.

The zoom lens according to the third embodiment has a magnification factor of 3.4. In zooming, the first lens group GR1, second lens group GR2, third lens group GR3 and fourth lens group GR4 are movable.

[Specifications of Zoom Lens]

Table 9 presents data of the lenses in Example 3, in which specific numerical values are applied to the zoom lens according to the third embodiment.

TABLE 9

| Surface Number i | Curvature Radius R | Spacing D | Refractive Index Nd | Abbe Number Vd |
|---|---|---|---|---|
| 1(ASP) | −110.6651 | 0.500 | 1.851348 | 40.1045 |
| 2(ASP) | 15.3496 | 4.030 |  |  |
| 3 | 23.2119 | 2.071 | 2.0027 | 19.317 |
| 4 | 45.0018 | 26.354 |  |  |
| 5(ASP) | 11.6328 | 3.150 | 1.77376 | 47.167 |
| 6(ASP) | 89.5151 | 0.114 |  |  |
| 7 | 18.0274 | 3.770 | 1.83481 | 42.7207 |
| 8 | −35.8276 | 0.860 | 1.74901 | 26.3211 |

TABLE 9-continued

| Surface Number i | Curvature Radius R | Spacing D | Refractive Index Nd | Abbe Number Vd |
|---|---|---|---|---|
| 9 | 7.0945 | 2.099 | | |
| 10 | 14.8808 | 2.500 | 1.53600 | 56.0000 |
| 11 | −69.3404 | 0.700 | | |
| 12 | INFINITY | 0.000 | Opening Aperture Stop | |
| 13(ASP) | 15.9495 | 2.256 | 1.592014 | 67.0227 |
| 14(ASP) | 8.598 | 4.682 | | |
| 15(ASP) | 39.6727 | 3.500 | 1.592014 | 67.0227 |
| 16(ASP) | −27.3308 | 5.083 | | |
| 17 | INFINITY | 0.300 | 1.516798 | 64.1983 |
| 18 | INFINITY | 0.150 | | |
| 19 | INFINITY | 0.500 | 1.556708 | 58.5624 |
| 20 | INFINITY | 1.000 | | |
| 21 | INFINITY | 0.000 | | |

In the zoom lens according to the third embodiment, the both surfaces of the negative lens L11 of the first lens group GR1 (first surface and second surface), the both surfaces of the positive lens L21 of the second lens group GR2 (fifth surface and sixth surface), the both surfaces of the positive lens L31 of the third lens group GR3 (thirteenth surface and fourteenth surface) and the both surfaces of the positive lens L41 of the fourth lens group GR4 (fifteenth surface and sixteenth surface) are non-spherical. Table 10 presents the conic constants κ and the fourth-order, sixth-order, eighth-order and tenth-order non-spherical coefficients A4, A6, A8 and A10 of these surfaces.

TABLE 10

| Surface Number | κ | A4 | A6 | A8 | A10 |
|---|---|---|---|---|---|
| 1 | 0 | −2.33658E−05 | 2.99644E−07 | −1.30761E−09 | 2.24873E−12 |
| 2 | 0 | −4.26426E−05 | 1.89583E−07 | 5.93809E−11 | −4.16583E−12 |
| 5 | 0 | −5.76019E−05 | 1.07946E−07 | −1.02566E−08 | 1.59268E−10 |
| 6 | 0 | −3.27108E−06 | 3.73169E−07 | −5.67274E−09 | 1.45302E−10 |
| 13 | 0 | −4.04314E−04 | 2.17415E−06 | 2.12322E−07 | −5.80455E−09 |
| 14 | 0 | −6.24948E−04 | 8.63458E−06 | −4.88741E−07 | 1.39341E−08 |
| 15 | 0 | 2.74349E−05 | −7.95024E−07 | 2.11429E−09 | 5.78434E−11 |
| 16 | 0 | 6.79183E−05 | −1.70419E−06 | 1.00861E−08 | 4.19559E−11 |

Table 11 presents the focal lengths f, F values Fno and half FOVs ω at the wide-angle end, at the intermediate focal length and at the telescopic end in Example 3.

TABLE 11

| | Wide-Angle End | Intermediate Focal Length | Telescopic End |
|---|---|---|---|
| f | 11.001 | 19.6216 | 36.991 |
| Fno | 1.868 | 3.1324 | 5.344 |
| ω | 32.848 | 21.690 | 12.049 |

In the zoom lens according to the third embodiment, a spacing D4 between the first lens group GR1 and second lens group GR2, a spacing D11 between the second lens group GR2 and third lens group GR3, a spacing D14 between the third lens group GR3 and fourth lens group GR4 and a spacing D16 between the fourth lens group GR4 and filter SG vary in zooming between the wide-angle end and telescopic end. Table 12 presents the variable spacings with respect to the respective spacings at the wide-angle end, at the intermediate focal length and at the telescopic end in Example 3.

TABLE 12

| | Wide-Angle End | Intermediate Focal Length | Telescopic End |
|---|---|---|---|
| f | 11.001 | 19.6216 | 36.991 |
| D4 | 26.354 | 10.549 | 2.743 |
| D11 | 0.700 | 2.334 | 2.200 |
| D14 | 4.682 | 9.764 | 26.137 |
| D16 | 5.083 | 4.770 | 3.412 |

[Aberration of Zoom Lens]

Figure 10:
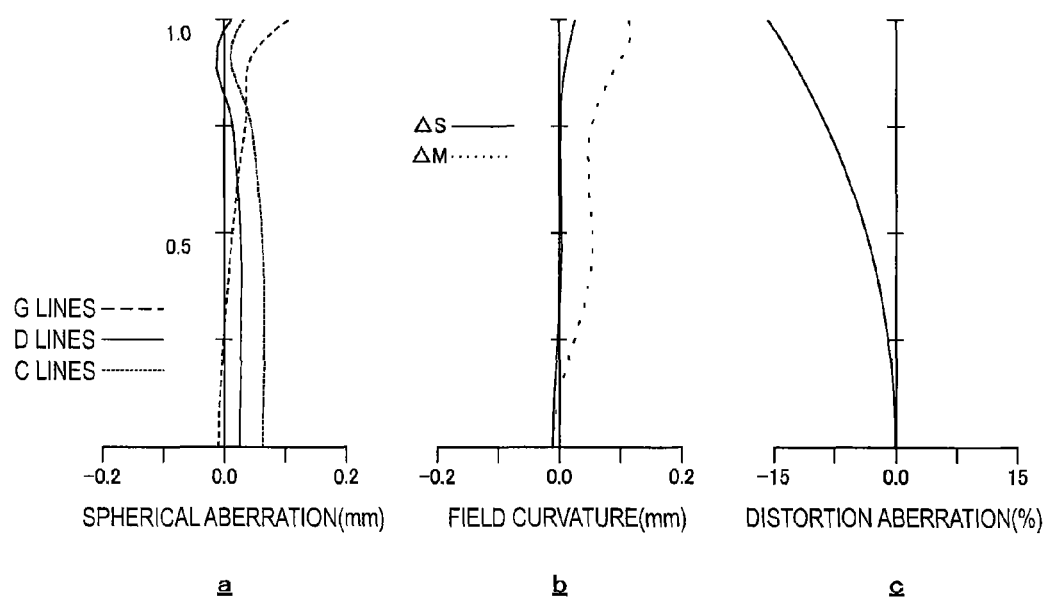
FIG. 10 illustrates aberration of the zoom lens according to the third embodiment of the present technology at the wide-angle end at infinity focus.
Figure 11:
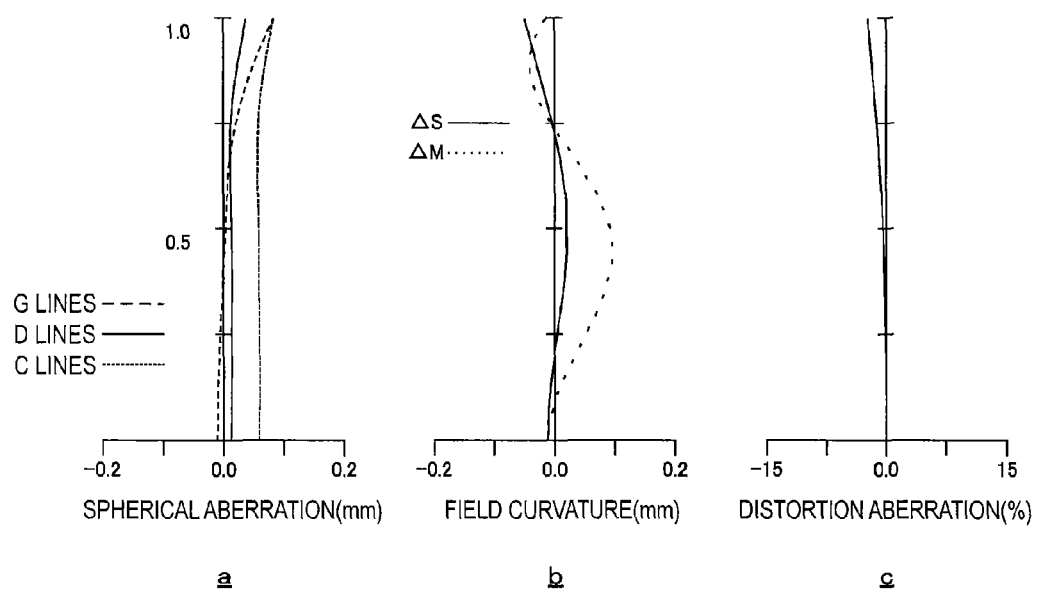
FIG. 11 illustrates aberration of the zoom lens according to the third embodiment of the present technology at the intermediate focal length at infinity focus.
Figure 12:
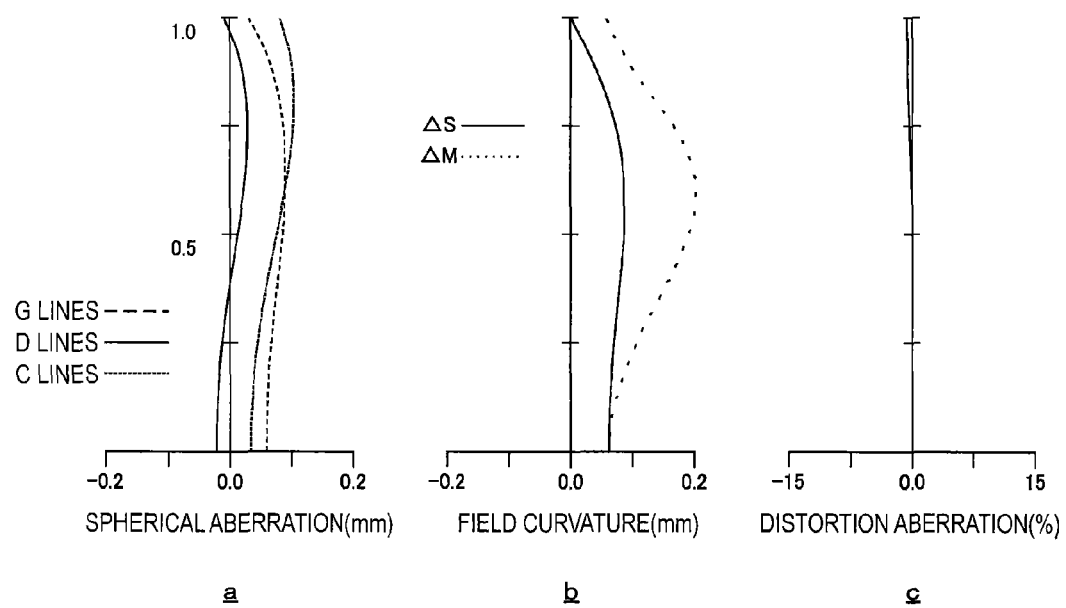
FIG. 12 illustrates aberration of the zoom lens according to the third embodiment of the present technology at the telescopic end at infinity focus.

FIGS. 10 to 12 illustrate aberration diagrams of the zoom lens according to the third embodiment of the present technology at infinity focus. FIG. 10, FIG. 11 and FIG. 12 illustrate aberration diagrams at the wide-angle end, at the intermediate focal length and at the telescopic end, respectively. Portions a, portions b and portions c in these figures illustrate spherical aberration diagrams, field curvature diagrams and distortion aberration diagrams, respectively.

In addition, in the spherical aberration diagrams, the solid lines, broken lines and dotted lines indicate values for the d lines (587.6 nm), g lines (wavelength of 435.8 nm) and c lines (wavelength of 656.3 nm). Moreover, in the astigmatism diagrams, the solid lines and dotted lines indicate values for the sagittal image surfaces and meridional image surfaces. It is apparent from the aberration diagrams that Example 3 attains excellent imaging performance, correcting the aberrations favorably.

[Summary of Conditional Expressions]

Table 13 presents the values in Examples 1 to 3 according to the first to third embodiments. It is apparent from the values that the conditional expressions (a) to (d) are satisfied.

TABLE 13

| | | Example 1 | Example 2 | Example 3 |
|---|---|---|---|---|
| | Δm3 | 1.490 | 1.433 | 1.500 |
| | fw | 11.004 | 11.003 | 11.001 |
| | ft | 35.424 | 35.438 | 36.991 |
| Conditional Expression (a) | Δm3/ $(fw \times ft)^{1/2}$ | 0.075 | 0.073 | 0.074 |
| | d23_max | 2.800 | 2.800 | 2.610 |
| Conditional Expression (b) | d23_max/ $(fw \times ft)^{1/2}$ | 0.142 | 0.142 | 0.129 |
| | f3g | −33.556 | −30.229 | −35.452 |
| Conditional Expression (c) | f3g/ft | −0.947 | −0.853 | −0.958 |
| | L | 16.258 | 15.502 | 3.039 |
| | Fno_w | 1.855 | 1.855 | 1.868 |
| Conditional Expression (d) | L × Fno_w | 1.539 | 1.456 | 0.281 |

4. Application Example

Configuration of Image Capturing Apparatus

Figure 13:
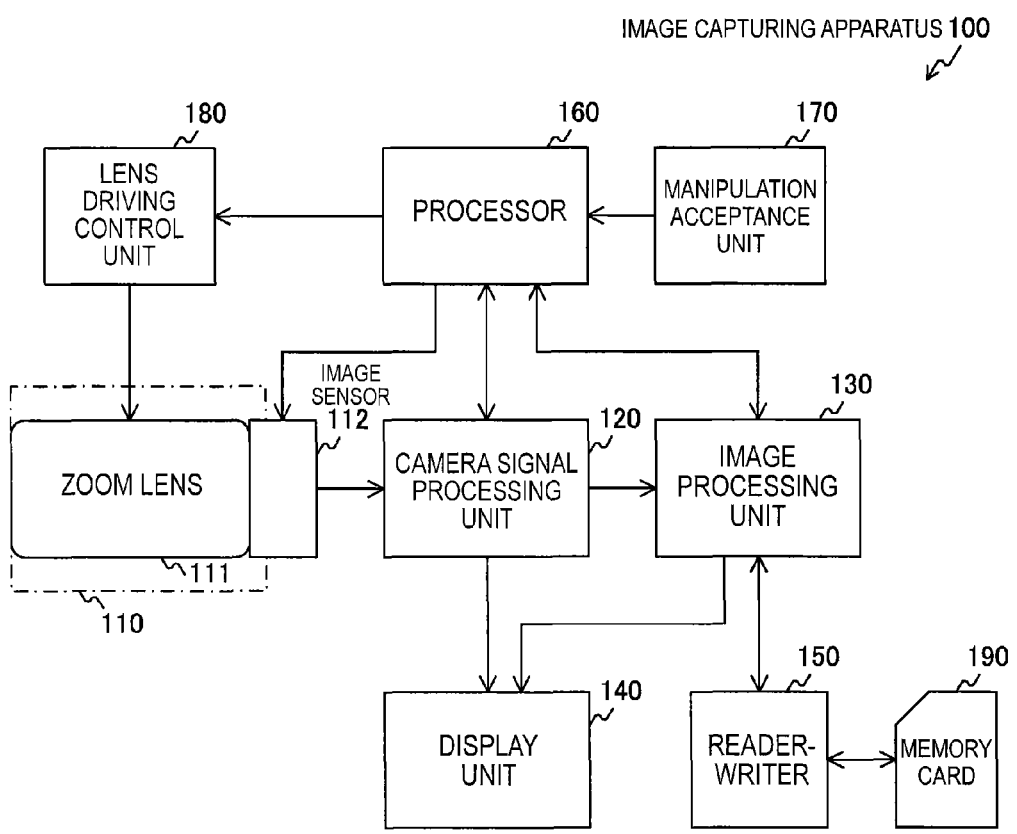
FIG. 13 is a diagram illustrating an image capturing apparatus 100 to which any of the zoom lenses according to the first to third embodiments of the present technology is applied.

FIG. 13 is a diagram illustrating an example of an image capturing apparatus 100 to which the zoom lens according to any of the first to third embodiments of the present technology. The image capturing apparatus 100 includes a camera block 110, a camera signal processing unit 120, an image processing unit 130, a display unit 140, a reader-writer 150, a processor 160, a manipulation acceptance unit 170 and a lens driving control unit 180.

The camera block 110 takes on an image capturing function, and includes a zoom lens 111 according to any of the first to third embodiments and an image sensor 112 converting an optical image formed by the zoom lens 111 into an electric signal. The image sensor 112 can employ a photoelectric transducer such, for example, as a CCD (Charge Coupled Device) and CMOS (Complementary Metal-Oxide Semiconductor). The zoom lens 111 is herein simply illustrated as a single lens, which indicates the lens groups according to any of the first to third embodiments.

The camera signal processing unit 120 performs signal processing such as analog-digital conversion on a captured image signal. The camera signal processing unit 120 converts an output signal from the image sensor 112 into a digital signal. Moreover, the camera signal processing unit 120 performs various kinds of signal processing such as noise reduction, image quality correction, conversion into luminance-chromaticity signals.

The image processing unit 130 performs recording/playing-back processing of the image signal. The image processing unit 130 performs compression encoding and decompression decoding of the image signal based on a predetermined image data format and conversion of data specifications such as resolution.

The display unit 140 displays the captured image and the like. The display unit 140 has a function of displaying a manipulation status in the manipulation acceptance unit 170 and various kinds of data of the captured image and the like. The display unit 140 can include, for example, a liquid crystal display (LCD).

The reader-writer 150 performs access to the memory card 190 which access is writing and read-out of the image signal. The reader-writer 150 writes the image data encoded by the image processing unit 130 to the memory card 190, and reads out the image data recorded in the memory card 190. The memory card 190 is, for example, a semiconductor memory removable to the slot connected to the reader-writer 150.

The processor 160 controls the whole image capturing apparatus. The processor 160 functions as a control processing unit controlling the individual circuit blocks provided in the image capturing apparatus 100, and controls the individual circuit blocks based on manipulation instruction signals from the manipulation acceptance unit 170.

The manipulation acceptance unit 170 accepts manipulation from the user. The manipulation acceptance unit 170 can implemented, for example, by a shutter release button for performing shutter operation, a selection switch for selecting an operation mode, and the like. The manipulation instruction signal accepted by the manipulation acceptance unit 170 is supplied to the processor 160.

The lens driving control unit 180 controls driving of the lenses disposed in the camera block 110. The lens driving control unit 180 controls a motor and the like (not illustrated in the figure) for driving the lenses of the zoom lens 111 based on the control signals from the processor 160.

In standing-by for image capturing, the image capturing apparatus 100 outputs the image signal captured by the camera block 110 via the camera signal processing unit 120 to the display unit 140 under the control of the processor 160, and displays it as a camera-through image. Moreover, upon acceptance of the manipulation instruction signal for zooming in the manipulation acceptance unit 170, the processor 160 outputs the control signal to the lens driving control unit 180, predetermined lenses in the zoom lens 111 are moved based on the control of the lens driving control unit 180.

Upon acceptance of the shutter manipulation in the manipulation acceptance unit 170, the captured image signal is outputted from the camera signal processing unit 120 to the image processing unit 130 to undergo compression encoding and conversion into digital data in a predetermined format. The converted data is outputted to the reader-writer 150 and written in the memory card 190.

Focusing is performed, for example, on the occasions such as a half push of the shutter release button and a full push thereof for recording (image capturing) in the manipulation acceptance unit 170. In this case, the lens driving control unit 180 moves the predetermined lenses in the zoom lens 111 based on the control signal from the processor 160.

When playing back the image data recorded in the memory card 190, the reader-writer 150 reads out a predetermined image data from the memory card 190 according to the manipulation accepted by the manipulation acceptance unit 170. Then, after decompression decoding by the image processing unit 130, the image signal to be played back is outputted to the display unit 140 and the played-back image is displayed.

Incidentally, in the above-mentioned embodiments, a digital still camera is supposed exemplarily as the image capturing apparatus 100, whereas the image capturing apparatus 100 is not limited to the digital still camera but can be widely applied to digital input/output equipment such as a digital video camera.

As above, according to the embodiments of the present technology, a zoom lens including four lens groups employs a cemented lens configured of two out of four lenses in the second lens group, this attaining the zoom lens which is small in dimensions and large in diameter and attaining its excellent optical performance. Namely, the zoom lens and the image capturing apparatus according to the embodiments of the present technology employ a zoom ratio of 2.5 to 5, an F value of 2.4 or less at the wide-angle end, a half FOV of 30° to 40° at the wide-angle end approximately, this attaining those which are small in dimensions and large in diameter and attaining high performance of those.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A zoom lens including: in order from an object side to an image side,
  a first lens group having negative refractive power;
  a second lens group having positive refractive power;
  a third lens group having negative refractive power; and
  a fourth lens group having positive refractive power,
    wherein, in zooming from a wide-angle end to a telescopic end, the first lens group moves to the object side in a manner that a distance toward the second lens group narrows, and a distance between the third lens group and the fourth lens group widens, wherein the third lens group includes a single lens or a single cemented lens, and wherein the following conditional expressions (a) and (b) are satisfied, $$\Delta m3/(fw \times ft)^{1/2} < 0.3 \quad \text{conditional expression (a):}$$

$$d23\_max/(fw \times ft)^{1/2} < 0.5 \quad \text{conditional expression (b):}$$

where

Δm3: a variation amount of a distance between the second lens group and the third lens group in varying magnification, and d23_max: a maximum value of the distance between the second lens group and the third lens group in varying magnification.

(2) The zoom lens according to (1), wherein the second lens group includes, in order from the object side, four lenses of a first positive lens, a second positive lens, a negative lens and a third positive lens, and wherein the second positive lens and the negative lens are joined with each other.

(3) The zoom lens according to (1) or (2), wherein the third lens group satisfies the following conditional expression (c), $$-3 < f3g/ft < -0.8 \quad \text{conditional expression (c):}$$

where f3g: a focal length of the third lens group, and ft: a system focal length at the telescopic end.

(4) The zoom lens according to any one of (1) to (3), wherein vibration isolation is performed by moving the third positive lens or the third lens group perpendicularly to an optical axis.

(5) The zoom lens according to any one of (1) to (4), including:

an aperture stop disposed on the second lens group or between the second lens group and the third lens group; and a light shielding member shielding a circumferential light ray on a part of the third lens group at the wide-angle end, wherein the following conditional expression (d) is satisfied, $$L \times Fno\_w/(fw \times ft)^{1/2} < 2.5 \quad \text{conditional expression (d):}$$

where

L: a distance along an optical axis between the aperture stop and the light shielding member at the wide-angle end, Fno_w: an F value at the wide-angle end, fw: a system focal length at the wide-angle end, and ft: a system focal length at the telescopic end.

(6) The zoom lens according to any one of (2) to (4), wherein each of the third positive lens and the third lens group includes a single lens made of a resin.

(7) The zoom lens according to any one of (1) to (6), further including a lens having substantially no lens power.

(8) An image capturing apparatus including:

a zoom lens including, in order from an object side to an image side, a first lens group having negative refractive power, a second lens group having positive refractive power, a third lens group having negative refractive power, and a fourth lens group having positive refractive power; and an image sensor converting an optical image formed by the zoom lens into an electric signal, wherein, in zooming from a wide-angle end to a telescopic end, the first lens group moves to the object side in a manner that a distance toward the second lens group narrows, and a distance between the third lens group and the fourth lens group widens, wherein the third lens group includes a single lens or a single cemented lens, and wherein the following conditional expressions (a) and (b) are satisfied, $$\Delta m3/(fw \times ft)^{1/2} < 0.3 \quad \text{conditional expression (a):}$$

$$d23\_max/(fw \times ft)^{1/2} < 0.5 \quad \text{conditional expression (b):}$$

where

Δm3: a variation amount of a distance between the second lens group and the third lens group in varying magnification, and d23_max: a maximum value of the distance between the second lens group and the third lens group in varying magnification.

(9) The image capturing apparatus according to (8), further including a lens having substantially no lens power.

The present disclosure contains subject matter related to that disclosed in Japanese Priority Patent Application JP 2012-118213 filed in the Japan Patent Office on May 24, 2012 the entire content of which is hereby incorporated by reference

What is claimed is:

1. A zoom lens comprising: in order from an object side to an image side, a first lens group having negative refractive power;

a second lens group having positive refractive power;

a third lens group having negative refractive power; and a fourth lens group having positive refractive power, wherein, in zooming from a wide-angle end to a telescopic end, the first lens group moves to the object side in a manner that a distance toward the second lens group narrows, and a distance between the third lens group and the fourth lens group widens, wherein the third lens group includes a single lens or a single cemented lens, and wherein the following conditional expressions (a) and (b) are satisfied, $$\Delta m3/(fw \times ft)^{1/2} < 0.3 \quad \text{conditional expression (a):}$$

$$d23\_max/(fw \times ft)^{1/2} < 0.5 \quad \text{conditional expression (b):}$$

where

Δm3: a variation amount of a distance between the second lens group and the third lens group in varying magnification, and d23_max: a maximum value of the distance between the second lens group and the third lens group in varying magnification.

2. The zoom lens according to claim 1, wherein the second lens group includes, in order from the object side, four lenses of a first positive lens, a second positive lens, a negative lens and a third positive lens, and wherein the second positive lens and the negative lens are joined with each other.

3. The zoom lens according to claim 1, wherein the third lens group satisfies the following conditional expression (c), $$-3 < f3g/ft < -0.8 \quad \text{conditional expression (c):}$$

where f3g: a focal length of the third lens group, and ft: a system focal length at the telescopic end.

4. The zoom lens according to claim 2,
wherein vibration isolation is performed by moving the third positive lens or the third lens group perpendicularly to an optical axis.

5. The zoom lens according to claim 1, comprising:
an aperture stop disposed on the second lens group or between the second lens group and the third lens group; and
a light shielding member shielding a circumferential light ray on a part of the third lens group at the wide-angle end,
wherein the following conditional expression (d) is satisfied, $$L \times Fno\_w/(fw \times ft)^{1/2} < 2.5 \qquad \text{conditional expression (d):}$$

where
L: a distance along an optical axis between the aperture stop and the light shielding member at the wide-angle end,
Fno_w: an F value at the wide-angle end,
fw: a system focal length at the wide-angle end, and
ft: a system focal length at the telescopic end.

6. The zoom lens according to claim 2,
wherein each of the third positive lens and the third lens group includes a single lens made of a resin.

7. An image capturing apparatus comprising:
a zoom lens including, in order from an object side to an image side,
a first lens group having negative refractive power,
a second lens group having positive refractive power,
a third lens group having negative refractive power, and
a fourth lens group having positive refractive power; and
an image sensor converting an optical image formed by the zoom lens into an electric signal,
wherein, in zooming from a wide-angle end to a telescopic end, the first lens group moves to the object side in a manner that a distance toward the second lens group narrows, and a distance between the third lens group and the fourth lens group widens,
wherein the third lens group includes a single lens or a single cemented lens, and
wherein the following conditional expressions (a) and (b) are satisfied, $$\Delta m3/(fw \times ft)^{1/2} < 0.3 \qquad \text{conditional expression (a):}$$

$$d23\_max/(fw \times ft)^{1/2} < 0.5 \qquad \text{conditional expression (b):}$$

where
Δm3: a variation amount of a distance between the second lens group and the third lens group in varying magnification, and
d23_max: a maximum value of the distance between the second lens group and the third lens group in varying magnification.

* * * * *